M. SEGEL.
THREADING DEVICE FOR MOVING PICTURE MACHINES.
APPLICATION FILED JUNE 18, 1913.
1,227,081.
Patented May 22, 1917.
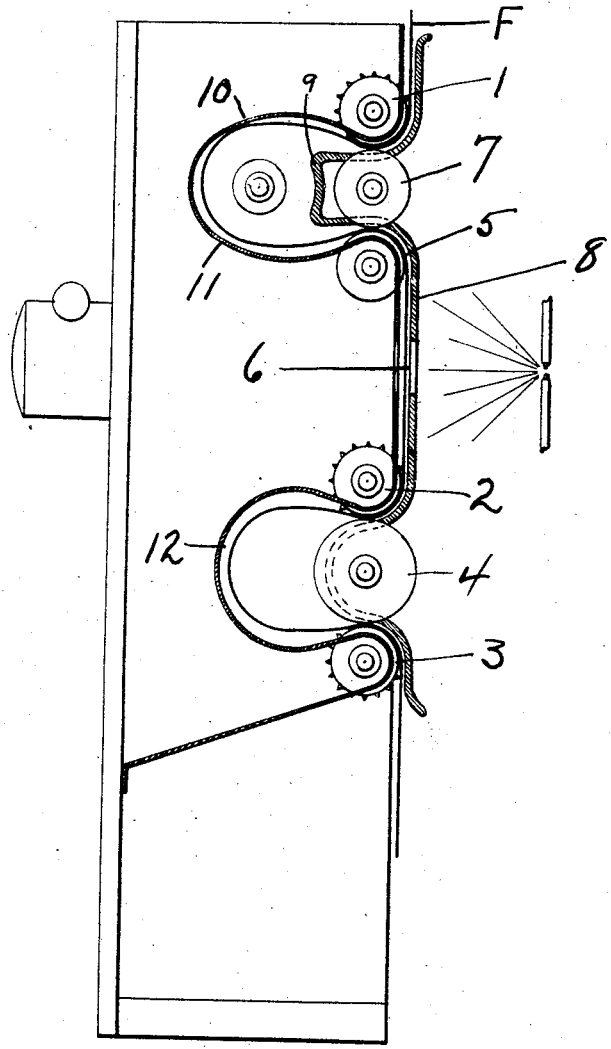
WITNESSES:
Mabel Dittenhoefer
Robert Richter
INVENTOR
Michael Segel
BY
F. Warren Wright
ATTORNEY

UNITED STATES PATENT OFFICE.

MICHAEL SEGEL, OF NEW YORK, N. Y.

THREADING DEVICE FOR MOVING-PICTURE MACHINES.

1,227,081. Specification of Letters Patent. Patented May 22, 1917.

Application filed June 18, 1913. Serial No. 774,304.

*To all whom it may concern:*

Be it known that I, MICHAEL SEGEL, a citizen of the United States, residing at New York city, in the county and State of New York, have invented certain new and useful Improvements in Threading Devices for Moving-Picture Machines, of which the following is a clear, full, and exact description.

This invention relates to moving picture projecting machines, and has for its object to provide means for automatically threading the film through the machine by the mere manipulation of the parts, thus saving time and insuring accuracy on the part of the operator.

In carrying out my invention, I provide a guide chute for the film to bring it into registry with the sprocket teeth of the first feeding roller for forming the first loop. I provide between the feeding roller and the idler roller above the aperture a guide cage in the general form of a loop of film, and I provide guides from such guide cage down to and embracing the intermittent feed roller to help guide the film, and I provide a second guide cage between the intermittent feed roller and the take-up feed roller, so that upon feeding the film into the first feed roller, and operating the machinery, the film will take up its proper loop shape in advance of being presented to the aperture, will descend past the aperture until engagement with the intermittent roller, will then be automatically formed into a loop, again engaged by the take-up feed roller and pass on to the reel of the machine to which it is attached in the usual manner by the operator.

The scope of my invention will be pointed out in the claims.

In the drawings:

The figure illustrates diagrammatically a projecting machine, the feed rollers and guides of this invention being shown in vertical cross section.

As shown in the drawings, 1 is the upper feed roller; 2 is the intermittent feed roller; 3 is the take-up feed roller; 4 is an idler wheel adapted to insure the engagement of the holes in the film with the teeth of the feed rollers 2 and 3; 5 is the idler feed roller without sprockets above the aperture 6; 7 is a roller between the reel 1 and the roller 5, adapted to keep the film in contact with the roller 5, and the teeth in engagement with the openings in the film; 8 is a plate curved outwardly at its upper end, passing on a curve around the feed roller 1, and squared off as shown at 9 with the loop of the film, again curved on a curve from the center of the roller 5, passing straight down between the roller 5 and the feed roller 2, in its straight position, being formed with the aperture 6, then again curving around the intermittent feed roller 2 and take-up feed roller 3. A guide strip 10 starts from the top of the machine, and is curved on a less radius than the feed roller 1, and on the outside of the same. It is then formed into a guide loop cage 11, again passes on the curve of less radius than the roller 5, then down parallel with the plate 8, which is formed with its aperture, again curves at a less diameter than the feed roller 2, is then bent out to form a cage 12 of the lower loop of the film, and again curves on a less radius than the diameter of the take-up feed roller 3. The plate 8 and the guide strip 10 are substantially parallel on all their curves where they bend around a roller. They are also parallel or substantially so, where they approach the feed roller, and where they pass the focal lines of the device. They are curved out freely to form the open cages 11 and 12 at those points in the machine where it is desired to form a loop.

In operation the film F is fed in until its holes are engaged by the feed roller 1. The machine is then rotated. The film, due to its own semi-rigidity, will follow the line of the curved cage 11, and be guided around until it meets the roller 5, which will then help force it down between the parallel portions of the plate 8 and the guided strip until it is engaged by the teeth of the intermittent reel 2, which will advance the film in the shape of a loop in the cage 12, and then guide it between the roller 4 and the take-up feed roller 3 from which it may be carried to the usual reel of the machine.

It will be understood that while this invention has its greatest utility in projecting machines, where often the operator is unskilled, that nevertheless it is applicable to the camera, and to the printing machine, or in any machine for the handling of moving picture films during any of the operations performed upon them, particularly where it is necessary to form a loop during the operation.

I claim as my invention:

1. In a motion picture machine or the like, an arrangement to thread a film automatically consisting of an uppermost continuously driven roller, an interiorly curved cage between said roller and an aperture, adapted to deliver a film from the continuously driven roller in the form of a loop to the aperture automatically.

2. In a motion picture machine, or the like, an arrangement consisting of curved guides and rollers for threading and leading a film over continuously and intermittently rotating rollers past an aperture automatically and creating loops in said film of proper size.

3. In a motion picture machine having an upper continuously driven roller and an aperture, a device consisting of rollers and curved guides arranged to form a loop in a film between said upper continuously driven roller and said aperture automatically.

4. In a motion picture machine or the like, an upper continuously driven feed roller, an aperture plate below said continuously driven feed roller, an intermittently driven feed roller below said aperture plate, a continuously driven feed roller below said intermittently driven roller, guides forming a loop pocket interposed between the uppermost continuously driven roller and the lowest continuously driven roller for the purpose of guiding a film for automatic threading from the uppermost feed roller to the lowest feed roller.

5. In a motion picture machine, or the like, an uppermost feed roller above the aperture, an intermittently driven feed roller below the aperture, a continuously driven feed roller below said intermittently driven feed roller, guides forming a loop pocket interposed between said uppermost feed roller and said lowest feed roller to advance a film automatically from said uppermost feed roller to said lowest feed roller and to create a loop between said uppermost feed roller and said intermittent feed roller, and to create a loop between said intermittently driven feed roller and said lowest feed roller automatically.

6. In a motion picture apparatus having a continuously driven feed roller and an aperture, and an intermittent feed roller, and a lower continuously driven feed roller, curved guides and rollers for leading a film to form a loop between said feed rollers from a free end of a film automatically.

7. In a motion picture machine or the like, having film feed rollers, a self-threading device consisting of guides forming a loop pocket to form a loop from a free end of a film between the feed rollers and to thread said film automatically through the machine.

8. In a motion picture machine or the like having film feed rollers, a self-threading arrangement consisting of guides forming a loop pocket and rollers between said feed rollers for the purpose of threading a film through the machine automatically.

9. In a motion picture machine or the like, having film feed rollers, a self-threading arrangement for a film consisting of guide pockets interposed between the film feed rollers to thread the film and to shape the loop in the machine automatically by rotating the film feed rollers.

10. In a motion picture machine or the like having feed rollers adapted to engage a film, in combination with film guide pockets adapted to automatically form a loop out of an advancing film.

11. In a motion picture apparatus or the like having feed rollers adapted to engage a film, in combination with guide pockets adapted to form a loop out of the advancing film automatically and additional guides to lead the film through the entire film path of the apparatus.

12. In a motion picture apparatus or the like, feed rollers adapted to engage a film, film guide pockets between said feed rollers adapted to form a loop out of an advancing film automatically, and additional guides and rollers to direct the film through the entire apparatus substantially as described.

13. In a motion picture machine, an upper continuously driven feed roller, a loop pocket adjacent thereto at least one roller in said pocket above the aperture, an intermittently driven roller below said aperture, a loop pocket adjacent to said intermittent roller, a continuously driven feed roller below said intermittent roller at least one roller between said intermittently driven roller and said continuously driven roller, guides interposed between the topmost continuously driven roller, and the lower continuously driven roller for the purpose of guiding the film from the uppermost feed roller to the lowest feed roller automatically and properly as required in a motion picture machine.

Signed at New York city, New York, this 31st day of May, one thousand nine hundred and thirteen.

MICHAEL SEGEL.

Witnesses:
E. C. DUFF,
ANTON MEHLFELDER.